United States Patent [19]

Faccou

[11] 3,715,134
[45] Feb. 6, 1973

[54] PIPE SWIVEL JOINT WITH A CARTRIDGE-TYPE PACKING UNIT

[75] Inventor: Armand L. Faccou, Santa Ana, Calif.

[73] Assignee: FMC Corpration, San Jose, Calif.

[22] Filed: June 25, 1971

[21] Appl. No.: 156,874

[52] U.S. Cl. ...................285/276, 277/36, 285/331
[51] Int. Cl. .................................................F16l 27/00
[58] Field of Search .....277/36, 58, 60, 64; 138/94.3; 285/276, 98, 31, 32, 16, 39, 272, 273, 274, 275, 277, 278, 279, 280, 281, 282, 331

[56] References Cited

UNITED STATES PATENTS

| 2,815,771 | 12/1957 | Gibbs | 138/94.3 |
| 2,927,805 | 3/1960 | Faccou | 285/276 X |
| 3,187,776 | 6/1965 | Snell | 138/94.3 |
| 3,415,285 | 12/1968 | Torp | 138/94.3 |
| 3,433,488 | 3/1969 | Grontom | 285/31 X |
| 3,442,288 | 5/1969 | Scaramucci | 285/31 X |

FOREIGN PATENTS OR APPLICATIONS

| 610,674 | 3/1935 | Germany | 285/32 |
| 929,404 | 6/1955 | Germany | 285/32 |

*Primary Examiner*—Dave W. Arola
*Attorney*—F. W. Anderson et al.

[57] ABSTRACT

A pipe swivel joint with an annular cartridge-type packing unit for providing a fluid-tight seal between the joint's male and female relatively rotatable conduit elements. The female conduit element includes a pair of opposed radial flanges spaced axially to form an annular packing chamber, and one or more removable spacers between the flanges to permit installation and replacement of the packing unit without having to disassemble the joint. The axial dimension of the packing unit is adjustable, whether it is inside or outside the joint's packing chamber, to facilitate its contraction to less than the axial dimension of the packing chamber so that it can be easily slipped into and out of the chamber, and also its expansion when in the chamber into fluid-tight relationship with the joint's relatively rotatable elements.

8 Claims, 10 Drawing Figures

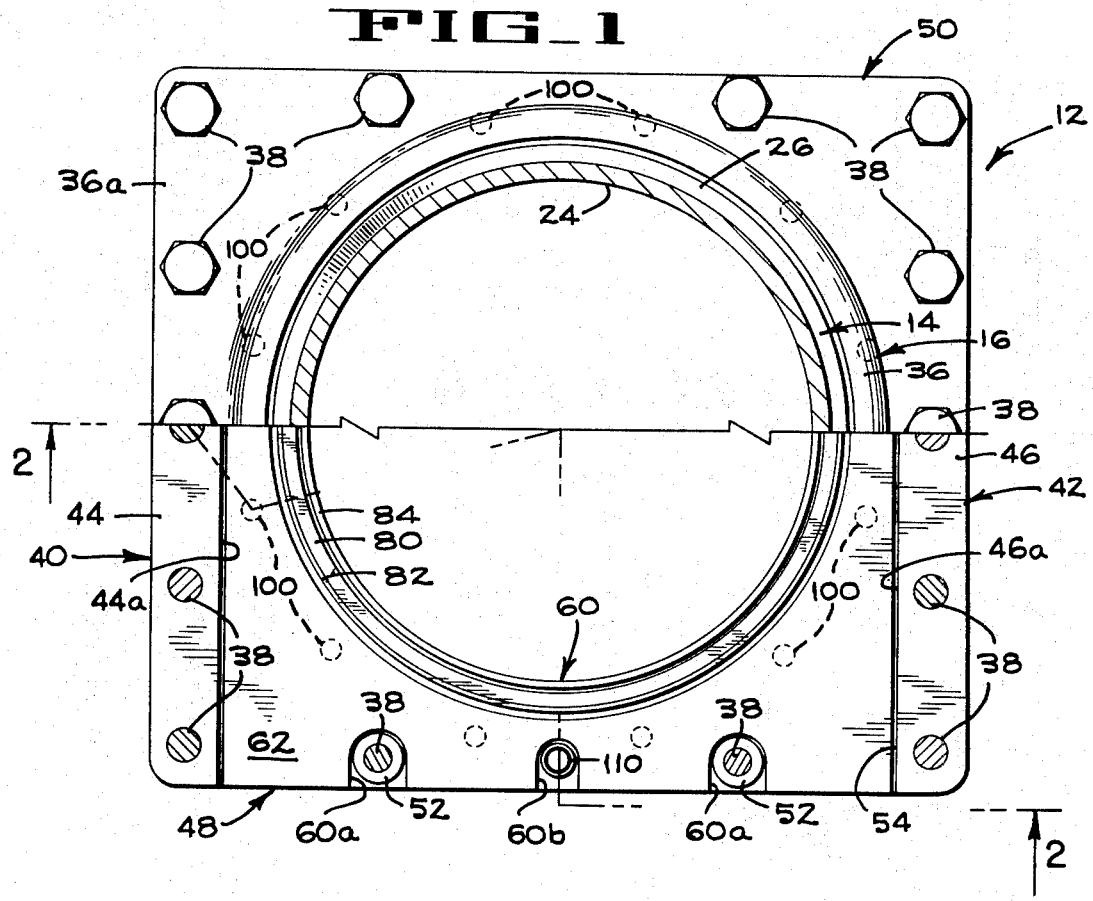
FIG_1
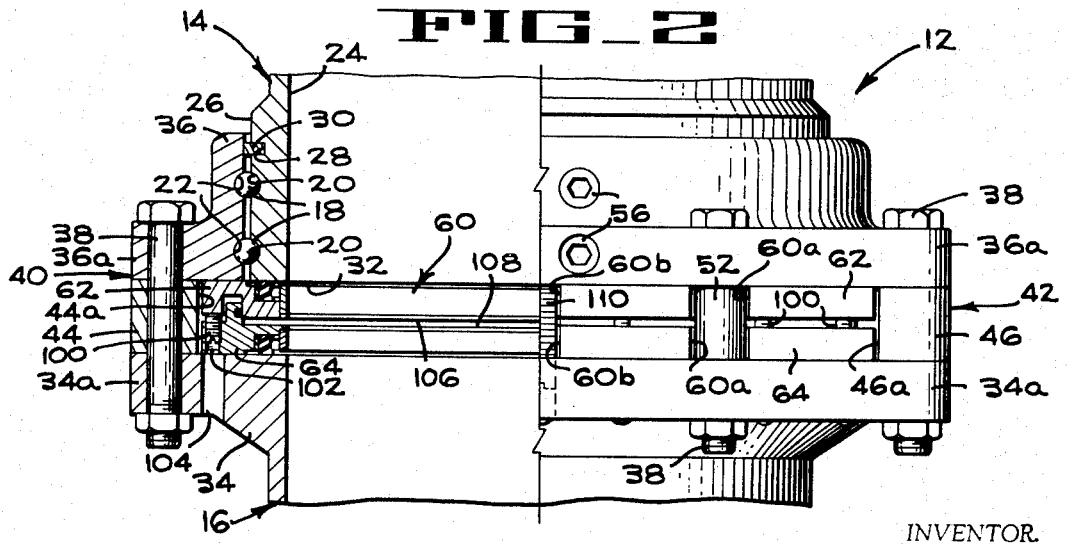
FIG_2
INVENTOR
ARMAND L. FACCOU

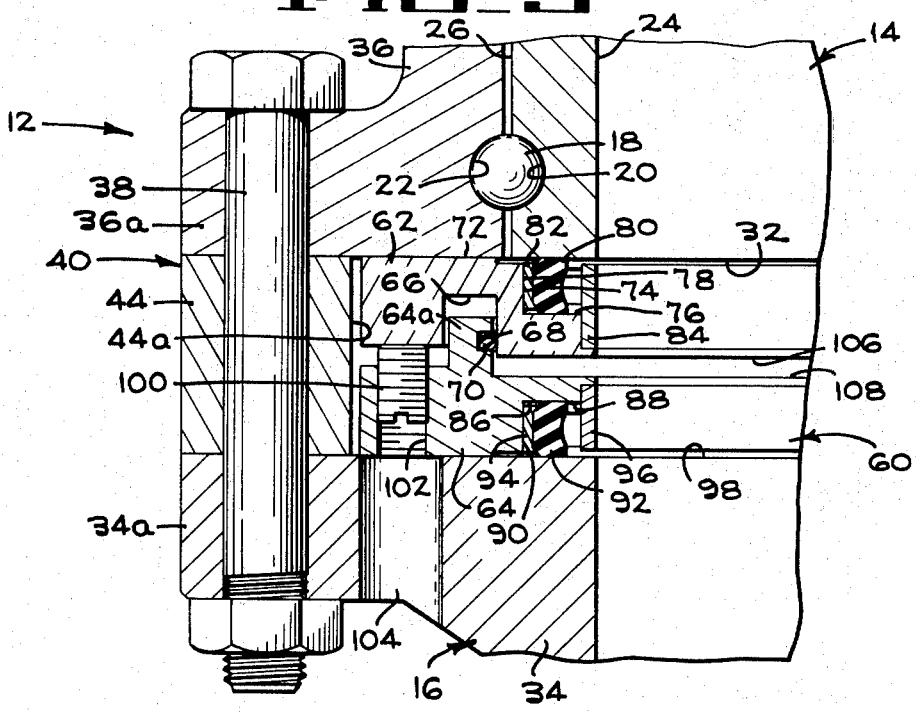

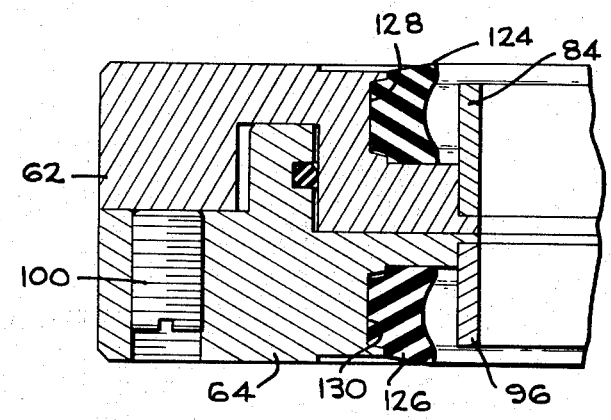
FIG_5
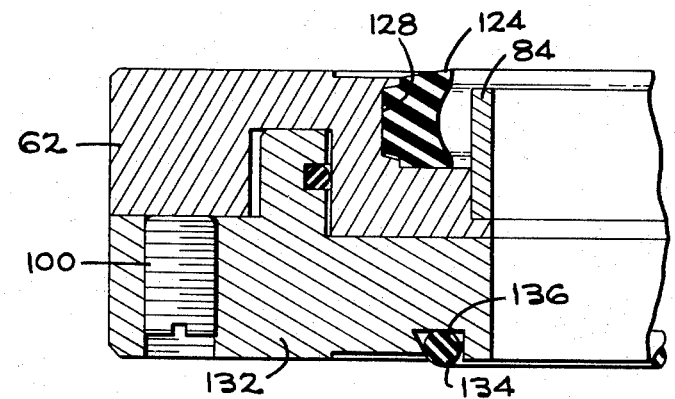
FIG_6

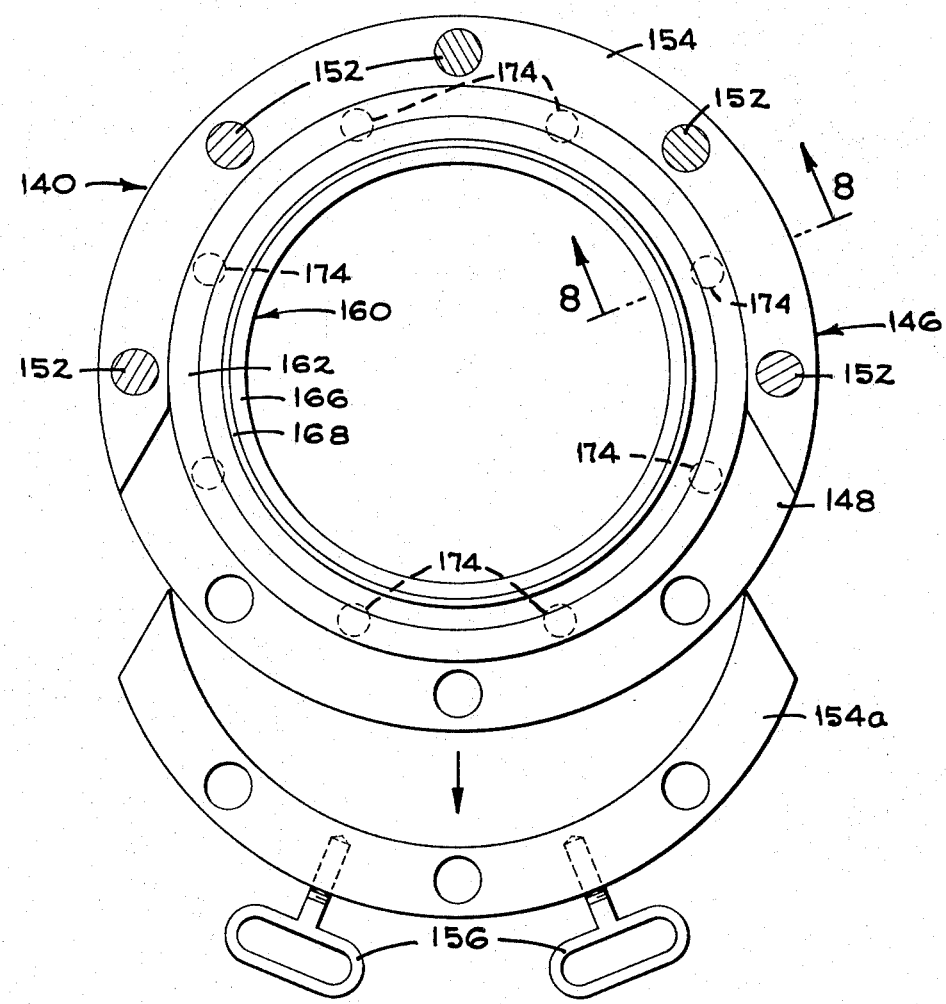
FIG_7
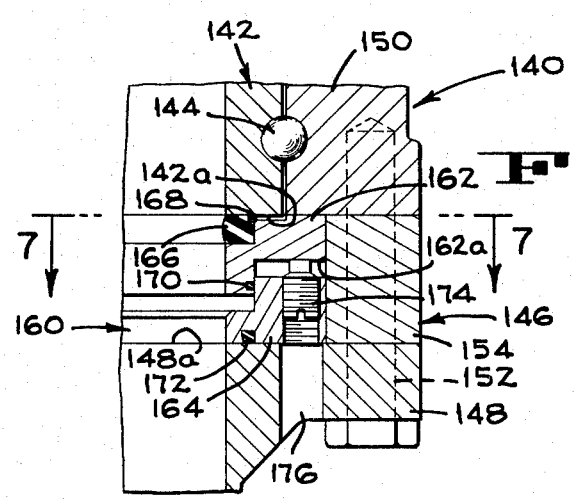
FIG_8

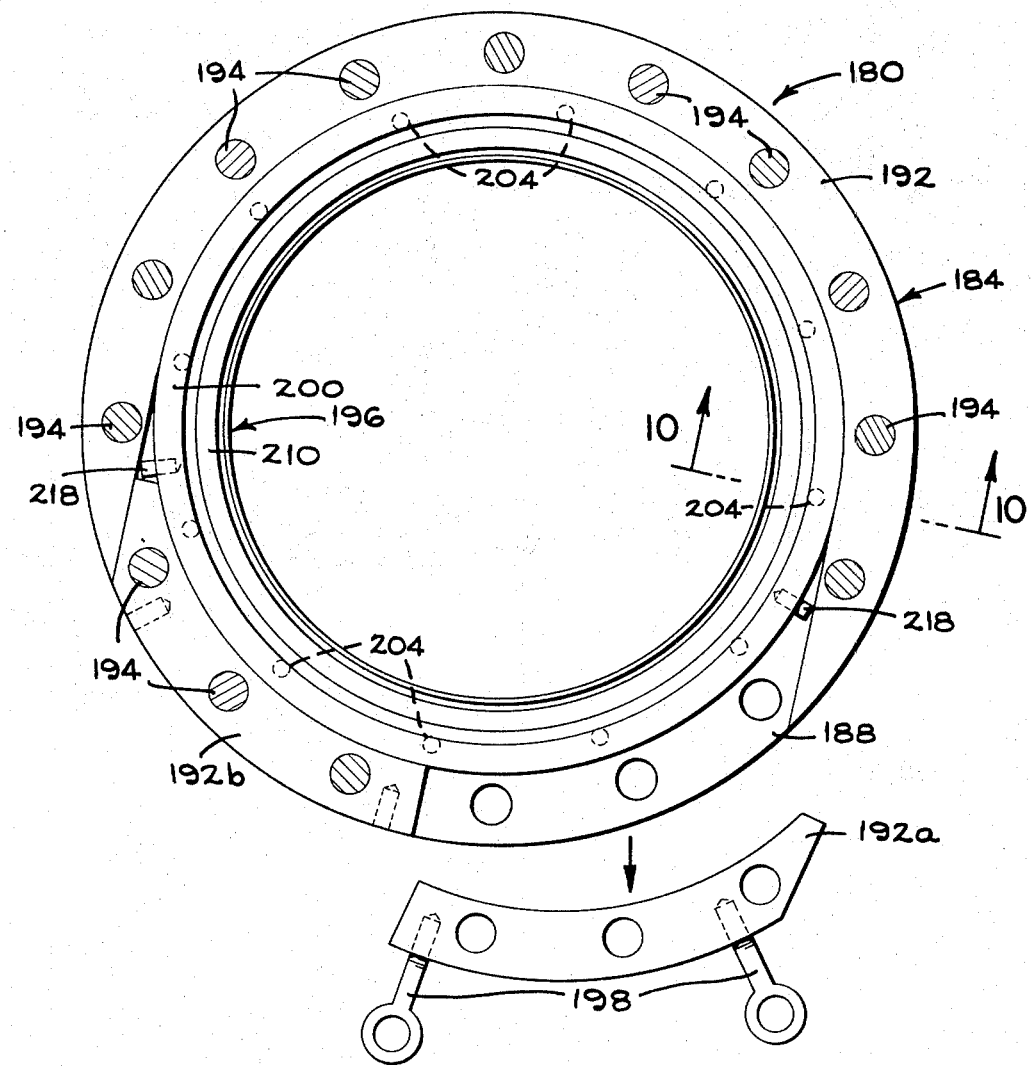
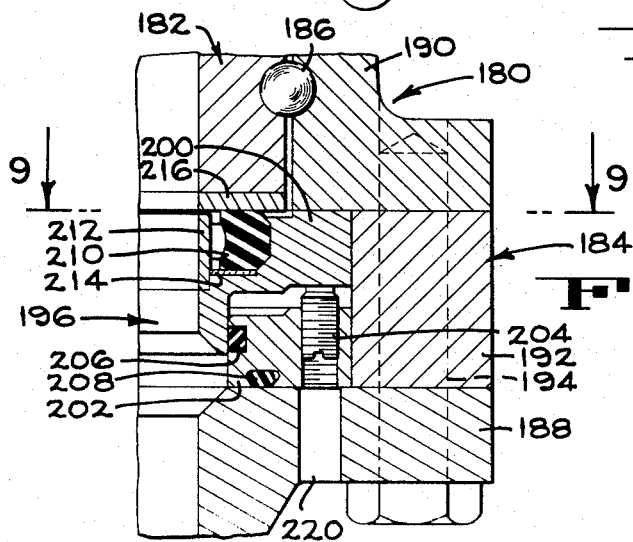
FIG_9
FIG_10

3,715,134

PIPE SWIVEL JOINT WITH A CARTRIDGE-TYPE PACKING UNIT

BACKGROUND OF THE INVENTION

This invention relates to pipe swivel joints and adjustable packings therefor, and more particularly to such swivel joints with packings that can be installed and removed while the joint remains assembled.

Pipe swivel joints, generally comprising interfitted male and female conduit elements rotatably secured together by an annular ball bearing system and sealed in fluid-tight relationship by an annular packing, are extensively used to interconnect the pipe sections in marine loading arms and other types of articulated pipe apparatus. These joints provide flexibility to the loading arm for maneuvering it into position with respect to a marine tanker or other vessel to which it is to be connected, and enable the arm to follow movements of the tanker as its position fluctuates in response to tide, current, wind or other forces. A major percentage of the present day marine tankers are capable of transporting hundreds of thousands of barrels of petroleum or other liquid cargo, and economical operation of these giant vessels requires transfer of their cargo in as short a time as possible.

As a consequence, loading arms now under construction for this purpose are huge devices with pipe diameters up to 24 inches, reaches of 100 feet, power equipment for maneuvering them, and counterweights commensurate with their movable mass. Repacking or otherwise servicing conventional swivel joints large enough for apparatus of this size usually requires considerable time plus the services of a crane or other equipment for supporting the arm components while they are disassembled. Further, in some instances the swivel joints are virtually inaccessible without dismantling the arm, especially if there are several arms mounted side by side in a row or bank, as is usually the case.

The prior art is replete with swivel joints that have replaceable packings, such as U.S. Pat. No. 2,518,443 to G.M. Bagnard, and there also are numerous publications showing swivel joints with adjustable packings, as for example U.S. Pat. No. 2,927,804 to R.E. Snyder et al., and my U.S. Pat. No. 3,420,555. Although these devices serve their intended purpose very satisfactorily, replacing their packings or otherwise servicing them in difficulty accessible locations, such as on the foregoing huge loading arms, presents many of the same problems as encountered with the conventional style of joints.

Accordingly, there still remains a decided need for a new type of swivel joint that can be successfully used in the largest marine loading arms, as well as in other locations difficult to reach, without having to employ large and costly handling equipment for its servicing, which has the requisite strength characteristics for these uses, and which has a packing that will satisfactorily withstand the elevated pressures, flow velocities, and other various stresses and strains encountered in such environments. Furthermore, the packing should be readily and easily replaceable, or otherwise serviceable, without special machinery or tools, and the steps involved in such servicing must be easy and straightforward to perform.

SUMMARY OF THE INVENTION

This invention comprises a cartridge-type packing unit for use in establishing a fluid tight dynamic seal between the relatively rotatable elements of a pipe swivel joint, and also includes a pipe swivel joint specially designed to simplify installing, removing, and adjusting this packing unit with a maximum of ease and a minimum of tools while the joint is assembled. The swivel joint's outer conduit member includes a pair of radially flanged tubular elements held together in spaced relation to form an annular packing chamber, and removable spacers between these flanges to facilitate installation and removal of the packing. The cartridge-type packing unit includes a pair of interfitting annular seal-retaining elements that establish a fluid-tight barrier between the joint's relatively rotatable inner and outer conduit members, and a system for adjusting these seal-retaining elements towards and away from each other in an axial direction, i.e., for axially contracting and expanding the packing unit. The outer conduit member of the swivel joint is provided with ports facilitating access to the packing unit's adjusting system from the outside of the joint, so that the packing can be axially expanded and contracted while in position in the packing chamber without need for dismantling the joint or the piping, etc., attached to it.

Accordingly, one object of this invention is to provide a cartridge-type packing unit for use in establishing and maintaining a fluid-tight dynamic seal between the relatively rotatable elements of a pipe swivel joint.

Another object of this invention is to provide an improved pipe swivel joint adapted for accepting a cartridge-type packing unit.

Another object of this invention is to provide a pipe swivel joint with an improved facility for installing and removing a cartridge-type packing as a unit while the joint is in assembled condition.

Yet another object of the invention is the provision of an improved cartridge-type packing unit that can be expanded and contracted in an axial direction to facilitate its installation into and removal from a packing chamber in a pipe swivel joint.

Still another object of this invention is the provision of an improved combination pipe swivel joint and cartridge-type packing, wherein the packing's axial dimension can be adjusted from outside the joint while the packing and joint are fully assembled.

BRIEF DESCRIPTION OF THE DRAWING

FIG. 1 is an end view of a swivel joint with a cartridge-type packing unit according to this invention, with part of the joint broken away to show the position of the packing unit when it is in place in the joint's packing chamber.

FIG. 2 is a view taken along the lines 2—2 of FIG. 1.

FIG. 3 is an enlarged view of the sectional portion of FIG. 2, illustrating in more detail the relationship of the packing unit to the swivel joint when the unit is installed and expanded into its functional position.

FIG. 4 is a view like FIG. 3, illustrating another arrangement for expanding and contracting the packing unit when in the packing chamber.

FIG. 5 is an enlarged view in section of another embodiment of packing unit according to this invention.

FIG. 6 is a view like FIG. 5, showing yet another embodiment of packing unit according to this invention.

FIG. 7 is an end view, from the position of line 7—7 in FIG. 8, of part of another form of swivel joint and cartridge-type packing unit embodying the present invention, this joint having an annular spacer element with a removable section for providing access to the packing chamber.

FIG. 8 is an enlarged fragmentary view in section, taken along the line 8—8 of FIG. 7, of a portion of the swivel joint showing in detail yet another cartridge-type packing unit embodying the present invention.

FIG. 9 is an end view of a modified version of the swivel joint illustrated in FIG. 7, this version having an annular spacer element with a pair of removable sections, one of which is removed, for providing access to the packing chamber while the joint is assembled.

FIG. 10 is a view like FIG. 8, taken along the line 10—10 of FIG. 9, illustrating still another version of cartridge-type packing unit according to this invention.

DESCRIPTION OF THE PREFERRED EMBODIMENTS

Broadly considered, and with reference to FIGS. 1, 2 and 3, one form of swivel joint 12 embodying the principles of the present invention comprises an inner or male conduit element 14, an outer or female conduit element 16, and a plurality of ball bearings 18 in annular raceways 20,22 for swivelly interconnecting the elements 14,16. The male element 14 has an inner wall 24 defining a flow passage through the element, a cylindrical outer wall 26 with an annular groove 28 for retaining an annular dust seal 30 that prevents entry of dust, dirt, and other outside contaminants into the bearing area, and an end wall 32 that provides a dynamic sealing surface for the packing between the male and female elements 14,16.

The female element 16 comprises a base member 34 and a bearing member 36 secured together by a plurality of circumferential bolts 38 that extend through outwardly extending, rectangular-shaped radial flanges 34a, 36a of these members. The flanges 34a, 36a are separated along the female elements opposite sides 40,42 by a pair of diametrically opposed, elongated spacers 44,46 and along the element's other two sides 48,50 by a plurality of sleeve-like spacers 52. As will be observed in FIGS. 1 and 2, the bolts 38 also pass through the spacers 44, 46 and 52, holding them in place between the flanges 34a, 36a. Thus, in the assembled condition as illustrated in FIGS. 1 and 2, the swivel joint 12 has a rectangular-shaped packing chamber 54 with closed opposite walls defined by the inner sides 44a, 46a of the elongated spacers 44,46 and opposite open ends along the female element's sides 48,50. As is conventional, the female element 16 also is provided with access ports from the outside into each bearing raceway for inserting and removing the bearing balls 18, these ports having removable closure plugs or the like 56 (FIG. 2).

One form of cartridge-type packing unit, according to this invention, that is suitable for use in the swivel joint 12 is illustrated in FIGS. 1–3. This packing unit 60 comprises a pair of annular seal-retaining elements 62,64 with rectangular-shaped outer peripheries of substantially the same size as the joint's packing chamber 54. The element 62 has an annular groove 66 for accepting in telescoping fashion an annular flange 64a extending axially from the element 64. An annular groove 68 in the flange 64a functions to retain in place an O-ring or other annular seal 70 that provides a fluid-tight barrier between the elements 62,64.

The radial wall 72 of the element 62 is counter-bored to provide a seal chamber 74 with a radial wall 76 and an axial annular wall 78. An annular dynamic seal element 80 is fitted in the seal chamber 74, so that when the cartridge unit 60 is installed in the swivel joint 12 the seal element 80 is compressed axially between the radial wall 76 and the end wall 32 of the male element 14, thereby establishing a dynamic fluid seal between the male element and the element 62. The seal 80 may be provided with an anti-extrusion ring 82 if desired, and a retainer ring 84 also can be included where high vacuum might be encountered in order that the seal 80 will not be drawn out of its chamber.

The element 64 likewise is counterbored to provide a seal chamber 86 having a radial wall 88 and an annular axial wall 90, and an annular static seal element 92 is fitted into the seal chamber 86, together with an anti-extrusion ring 94 and a retainer ring 96 if desired. The seal element 92 is compressed between the radial wall 88 of the chamber 86 and the radial wall 98 of the female element's base member 34 when the packing unit 60 is in place in the swivel joint 12, and thus provides a fluid tight barrier between the element 64 and the female element 16.

In its functional position in the swivel joint 12 (best seen in FIG. 3), the packing unit 60 is in expanded condition, i.e., the elements 62,64 are spaced apart axially, and held in this condition by a plurality of circumferentially spaced jack screws 100 that are threadably engaged with tapped holes 102 in the element 64. An access port 104 through the base member 34 of the female element 16 is provided for each of the jack screws 100, thereby facilitating their manipulation from the outside of the swivel joint 12 by an allen wrench, screwdriver, or the like depending upon what type of fitting is provided in the head of the screw.

The packing unit 60 is designed for insertion into, or removal from, the swivel joint's packing chamber 54 in a contracted condition, i.e., with the jack screws 100 withdrawn into the element 64 and the opposed surfaces 106, 108 of the elements 62,64 in contact. By removing the spacers 52 along the female element's side 48, the packing unit 60 can be inserted into or removed from the packing chamber 54 from that side. Likewise, removal of the spacers 52 along the opposite side 50 facilitates installation or removal of the unit 60 from that side. Since the spacers 52 preferably fit snugly between the opposed flanges 34a, 36a, one or more jack screws 110, threaded through suitably spaced holes in one of the flanges (flange 34a in FIGS. 1 and 2) towards the opposite flange, are provided to spread the flanges just enough to facilitate installing or removing the spacers. Thus the procedures for installing and removing the packing unit 60 are very simple, requiring only a screwdriver, wrench and average mechanical skill.

As is best seen in FIG. 1, the packing unit 60 is provided with notches 60a that cooperate with the spacers 52 to properly position the unit in the packing chamber 54. The packing unit also is notched at 60b to accommodate threading the jack screw 110 against the opposing flange to free the spacers 52.

Although shown as separate elements, the elongated spacers 44,46 also may be formed as integral extensions of the flanges 34a, 36a if so desired.

A modified version of the arrangement for expanding the packing unit 60 into its functional position in the swivel joint 12 is illustrated in FIG. 4. This version comprises a plurality of screws 112 extending through circumferentially spaced holes 114 in the flange 36a into tapped holes 116 in the packing unit element 62, and another plurality of screws 118 extending through holes 120 in the flange 34a into threaded engagement with tapped holes 122 in the element 64. Thus, in this version the element 62, 64 are directly secured to their adjacent flanges 36a, 34a, respectively, instead of indirectly by pressure as in the FIGS. 1-3 version. As is now apparent, removing the screws 112,118 permits the elements 62,64 to contract axially towards each other for withdrawal of the packing unit 60 from the packing chamber 54, and when the packing unit 60 is inserted into place within the packing chamber 54 the screws 112,118 are threaded into the elements 62,64 to expand the unit into its functional position illustrated in FIG. 4.

FIG. 5 illustrates a slightly modified form of the packing unit 60 in a contracted condition ready for insertion into or removal from the swivel joint's packing chamber. In this form there are no anti-extrusion rings surrounding the resilient annular seals 124,126, but instead these seals are fitted tightly into annular grooves 128,130 in the packing unit's elements 62,64, respectively. This form of the packing unit also includes the retainer rings 84,96 for protecting the seals 124,126 when the unit is used in a high vacuum atmosphere.

Another version of the packing unit 60 is illustrated in FIG. 6. In this version, the unit's element 62 is identical to its counterpart in FIG. 5, but the element 132 is provided with an O-ring 134 in an annular groove 136 instead of the annular seal 126 and groove 130 as in FIG. 5.

FIGS. 7 and 8 illustrate the invention incorporated in a slightly different form of swivel joint and packing unit that provide all of the advantages available in the foregoing version. In this form the swivel joint 140 includes a male conduit element 142 (FIG. 8) rotatably connected through a conventional ball bearing system 144 to a female conduit element 146 that has a round, instead of rectangular, periphery. As in the version of FIGS. 1-3, the female element 146 (FIG. 8) comprises a base member 148 and a bearing member 150 secured together by a suitable plurality of cap screws (or bolts) 152, but these members are separated by a single annular spacer 154 that has a removable section 154a to provide access to the joint's annular packing chamber. The spacer section 154a can be removed simply and quickly by removing the cap screws that pass through it and then withdrawing it in the direction of the arrow (FIG. 7). Removable handles, such as those depicted at 156 in FIG. 7, provide a ready means of gripping and maintaining a secure hold on the spacer section 154a. Replacing this spacer section is, of course, accomplished by reversing the foregoing procedure.

The annular cartridge-type packing unit 160 in the swivel joint 140 is comprised of two telescoping seal-retaining elements 162,164 similar in several respects to the packing units previously described, and differing from them chiefly in their generally L-shaped cross-sectional configuration. As illustrated in FIG. 8, the element 162 supports an annular resilient seal element 166, with a rigid anti-extrusion ring 168, to provide a dynamic fluidtight seal between this element and the adjacent radial end surface 142a of the swivel joint's male element 142, and annular resilient seals 170,172 function to maintain fluid-tight integrity between the elements 162 and 164 and the element 164 and the adjacent radial end surface 148a of the base member 148, respectively, when the jack screws 174 are threaded, as by a screwdriver through access ports 176, tightly against the back radial surface 162a of the element 162.

The swivel joint 180 illustrated in FIGS. 9 and 10 is very similar to the joint 140 of FIGS. 7 and 8, having round male and female conduit elements 182,184 rotatably interconnected by a ball bearing system 186, and with the female element including a base member 188, a bearing member 190 and an annular spacer 192, the members 188 and 190 and the spacer 192 secured together by a plurality of suitably spaced cap screws (or bolts) 194. The spacer 192 has a pair of removable sections 192a, 192b to facilitate installing and removing a cartridge-type packing unit, for example such as that of 196 illustrated in FIG. 10. Section 192a is shown (FIG. 9) removed from the swivel joint 180, this being easily accomplished by removing those cap screws that pass through and secure the section to the female element's base and bearing members 188,190 and withdrawing it with, for example, handles such as represented at 198.

The cartridge-type packing unit 196 is very similar to the unit 160 (FIGS. 7 and 8), having a pair of telescoping elements 200,202, a plurality of suitably spaced jack screws 204, an annular seal 206 between the elements 200,202, an annular static seal 208 between the element 202 and the base member 188 and an annular dynamic seal 210 between the element 200 and the element 182. However, as best seen in FIG. 10, the element 202 has a generally rectangular shaped cross-section, and the element 200 is fitted with an annular seal retainer 212. This packing unit 196 further includes a polyvinyl chloride packing face 214 bonded to the seal 210 and another packing face 216 of stainless steel fixed to the end surface of the male element 182. To aid in properly positioning the packing unit 196 in the swivel joint's packing chamber, a pair of pins 218 (FIG. 9) can be included in the element 202, thereby alleviating the possibility of having to rotate the unit in the packing chamber until the jack screws 204 are aligned with their access ports 220 (FIG. 10).

Although the best mode contemplated for carrying out the present invention has been herein shown and described, it will be apparent that modification and variation may be made without departing from what is regarded to be the subject matter of the invention.

I claim:

1. A pipe swivel joint with a replaceable cartridge-type, packing unit, comprising
    a female conduit element having a base member with a radial end wall, a bearing member with a radial end wall axially spaced from the base member end wall, removable spacer means intermediate the base and bearing member end walls, and means securing the spacer means and the base and bearing members together to establish a packing chamber defined by the base and bearing member end walls;

a male conduit element rotatably interconnected with the female conduit element and having a radial end wall generally coextensive with the bearing member end wall;

a cartridge-type packing unit in the packing chamber, said packing unit including first and second generally annular seal retainers adjustable axially with respect to each other, a first annular static seal means between and sealingly engaging the seal retainers throughout their axial adjustment, a second annular static seal between and sealingly engaging the first seal retainer and the base member end wall, and an annular dynamic seal between and sealingly engaging the second seal retainer and the male element end wall; and means accessible from outside the swivel joint for axially adjusting the seal retainers with respect to each other while the packing unit is, in place in the packing chamber.

2. A pipe swivel joint according to claim 1 wherein one of the seal retainers has an annular axial flange in telescoping relationship with the other seal retainer, and wherein the first static seal forms a fluidtight barrier between the flange and the other seal retainer.

3. A pipe swivel joint according to claim 1 wherein the means for axially adjusting the seal retainers comprises a plurality of circumferentially spaced jack screws threadedly engaging one of the seal retainers and bearing against the other seal retainer.

4. A pipe swivel joint according to claim 1 wherein the means for axially adjusting the seal retainers comprises a first plurality of circumferentially spaced screws extending through the base member into threaded engagement with one of the seal retainers and a second plurality of circumferentially spaced screws extending through the bearing member into threaded engagement with the other seal retainer.

5. A pipe swivel joint according to claim 1 wherein the periphery of the packing unit is generally rectangular, and the spacer means includes a pair of straight elongated spacers positioned along opposite sides of the packing chamber so that the packing unit is slidably disposed therebetween.

6. A pipe swivel joint according to claim 1 wherein the periphery of the packing unit is generally round, and the spacer means includes at least one arcuate elongated spacer that is removable from the swivel joint to facilitate installation and removal of the packing unit.

7. A pipe swivel joint according to claim 1 including jack screw means for spreading the base and bearing member end walls sufficiently to enable easy insertion and removal of the packing unit.

8. A pipe swivel joint according to claim 1 wherein the spacer means includes at least one spacer that also serves as a guide and stop for the packing unit.

* * * * *